United States Patent
Murata et al.

(10) Patent No.: US 10,694,156 B2
(45) Date of Patent: Jun. 23, 2020

(54) RECORDING APPARATUS FOR VEHICLE

(71) Applicant: JVC KENWOOD Corporation, Yokohama-shi, Kanagawa (JP)

(72) Inventors: Toshitaka Murata, Yokohama (JP); Yasuo Yamada, Yokohama (JP); Keita Hayashi, Yokohama (JP)

(73) Assignee: JVCKENWOOD Corporation, Yokohama-Shi, Kanagawa (JP)

( * ) Notice: Subject to any disclaimer, the term of this patent is extended or adjusted under 35 U.S.C. 154(b) by 0 days.

(21) Appl. No.: 16/186,177

(22) Filed: Nov. 9, 2018

(65) Prior Publication Data

US 2019/0082150 A1 Mar. 14, 2019

Related U.S. Application Data

(63) Continuation of application No. PCT/JP2017/036002, filed on Oct. 3, 2017.

(30) Foreign Application Priority Data

Nov. 24, 2016 (JP) ................................ 2016-227577

(51) Int. Cl.
*H04N 5/77* (2006.01)
*H04N 7/18* (2006.01)
(Continued)

(52) U.S. Cl.
CPC ............... *H04N 7/188* (2013.01); *B60R 1/00* (2013.01); *B60R 11/0235* (2013.01);
(Continued)

(58) Field of Classification Search
USPC ........................................ 386/224–226, 248
See application file for complete search history.

(56) References Cited

U.S. PATENT DOCUMENTS 7,728,721 B2 * 6/2010 Schofield ............ B60C 23/0401
340/438
8,154,418 B2 * 4/2012 Peterson ................... B60R 1/12
340/815.4
(Continued)

FOREIGN PATENT DOCUMENTS

EP 3018560 A1 5/2016
JP 2006-127470 A 5/2006

OTHER PUBLICATIONS

Extended European Search Report for related EP App No. 17874673.1 dated Jan. 16, 2019, 8 pgs.

*Primary Examiner* — Nigar Chowdhury
(74) *Attorney, Agent, or Firm* — Procopio, Cory, Hargreaves & Savitch LLP (57) ABSTRACT

A recording apparatus for a vehicle capable of recording a video image with reduced reflected glare is provided. A recording apparatus for a vehicle according to the present invention includes a main body part comprising at least a camera, a mounting part configured to mount the main body part so that the camera is oriented to photograph outside of a vehicle through a windshield provided in the vehicle, and a display unit configured to display information. The display unit is rotatably mounted at a lower part of the main body part and is positioned to block light from below the camera when the display unit rotates in a direction in which the camera photographs a video image and a display surface of the display unit faces downward, which is referred to as a first arrangement.

8 Claims, 8 Drawing Sheets

(51) Int. Cl.
*B60R 1/00* (2006.01)
*H04N 5/225* (2006.01)
*G07C 5/00* (2006.01)
*B60R 11/02* (2006.01)
*B60R 11/04* (2006.01)
*H04N 9/80* (2006.01)
*B60R 11/00* (2006.01)

(52) U.S. Cl.
CPC ............... *B60R 11/04* (2013.01); *G07C 5/00* (2013.01); *H04N 5/2257* (2013.01); *H04N 5/772* (2013.01); *H04N 7/18* (2013.01); *B60R 2011/0026* (2013.01); *B60R 2011/0085* (2013.01); *B60R 2300/20* (2013.01)

(56) References Cited

U.S. PATENT DOCUMENTS

| | | | |
|---|---|---|---|
| 8,256,821 B2 * | 9/2012 | Lawlor | B60R 1/12 296/37.8 |
| 8,976,247 B1 * | 3/2015 | Karner | B29C 45/0017 348/148 |
| 9,031,624 B2 * | 5/2015 | Ignomirello | G02B 27/0149 455/575.9 |
| 9,191,634 B2 * | 11/2015 | Schofield | G06K 9/00818 |
| 9,266,474 B2 * | 2/2016 | DeWard | B60R 11/04 |
| 9,283,900 B2 * | 3/2016 | DeLine | B60R 1/12 |
| 9,487,144 B2 * | 11/2016 | Blank | B60R 1/12 |
| 9,712,741 B2 * | 7/2017 | Kothari | B60R 11/0235 |
| 9,776,568 B2 * | 10/2017 | Hoyda | B60R 11/04 |
| 9,789,819 B2 * | 10/2017 | Watanabe | B60R 1/00 |
| 10,029,621 B2 * | 7/2018 | Vojtisek | B60R 11/04 |
| 10,053,009 B2 * | 8/2018 | Kim | B60Q 3/51 |
| 10,296,083 B2 * | 5/2019 | Sung | G06F 3/1431 |
| 10,444,603 B2 * | 10/2019 | Hsu | F16M 11/12 |
| 2006/0069783 A1 | 3/2006 | Aihara et al. | |
| 2010/0073480 A1 * | 3/2010 | Hoek | G01P 1/08 348/148 |
| 2010/0253526 A1 * | 10/2010 | Szczerba | G01S 13/867 340/576 |
| 2010/0253541 A1 * | 10/2010 | Seder | G01S 13/723 340/905 |
| 2011/0043634 A1 * | 2/2011 | Stegmann | B60R 1/00 348/148 |
| 2011/0301813 A1 * | 12/2011 | Sun | B62D 15/029 701/41 |
| 2013/0229522 A1 | 9/2013 | Schofield et al. | |
| 2016/0297377 A1 | 10/2016 | Salomonsson et al. | |
| 2017/0255824 A1 * | 9/2017 | Miller | G06K 9/00624 |

* cited by examiner

RECORDING APPARATUS FOR VEHICLE

CROSS REFERENCE TO RELATED APPLICATION

This application is a Continuation of International Application No. PCT/JP2017/036002 filed on Oct. 3, 2017, which is based upon and claims the benefit of priority from Japanese Patent Application No. 2016-227577 filed on Nov. 24, 2016, the disclosure of which are incorporated herein in their entirety by reference.

BACKGROUND

The present invention relates to a recording apparatus for a vehicle. In particular, the present invention relates to a recording apparatus for a vehicle such as a drive recorder used in a vehicle for recording a video image related to the vehicle.

In recent years, a drive recorder as a recording apparatus for a vehicle has become increasingly widespread. A common drive recorder is mounted on an upper part of a windshield of a vehicle by, for example, a bracket. For example, Japanese Unexamined Patent Application Publication No. 2006-127470 discloses use of a drive recorder that is attached to a windshield of a vehicle by a mounting bracket.

SUMMARY

Many drive recorders such as the above-mentioned drive recorder of Japanese Unexamined Patent Application Publication No. 2006-127470 are installed close to the windshields in order to photograph the outside of the vehicle through the windshields of the vehicles. Since the windshields of the vehicles are often installed at an inclination, light from the inside of the vehicle or from the outside of the vehicle is reflected on the inclined windshield, and the dashboard positioned under the drive recorder and surrounding objects and the like are reflected on a video image of the drive recorder.

Such reflected glare is noticeable when sunlight during the day is incident or when street light at night is incident.

When the video image recorded in the drive recorder includes such reflected glare, the quality of the recorded video image is degraded.

An example aspect is a recording apparatus for a vehicle including: a main body part including at least a camera; a mounting part configured to mount the main body part so that the camera is oriented to a direction in which the camera photographs a range including a horizontal direction of the vehicle through a windshield included in the vehicle; and a display unit configured to display information. The display unit is rotatably mounted at a lower part of the main body part and is positioned to block light from below the camera when the display unit rotates in a direction in which the camera photographs a video image and a display surface of the display unit faces downward, which is referred to as a first arrangement.

DETAILED DESCRIPTION

Hereinafter, embodiments of the present invention will be described below with reference to the drawings. In the following descriptions, an example in which a drive recorder for detecting and recording an event such as a shock will be described as an example of a recording apparatus for a vehicle according to this embodiment. However, the present invention is not limited to this. For example, the recording apparatus for a vehicle may be an apparatus that performs recording and reproduction in response to a user's request, in addition to being a drive recorder.

Although the recording apparatus for a vehicle according to this embodiment is described as an apparatus mounted on a windshield of an automobile to be used, a position at which and an object on which the apparatus is mounted are not limited to those in this embodiment. For example, the recording apparatus for a vehicle may be mounted on an inner mirror or a ceiling part of an automobile, or may be mounted on work equipment and a two-wheeled vehicle, in addition to a car.

Figure 1:
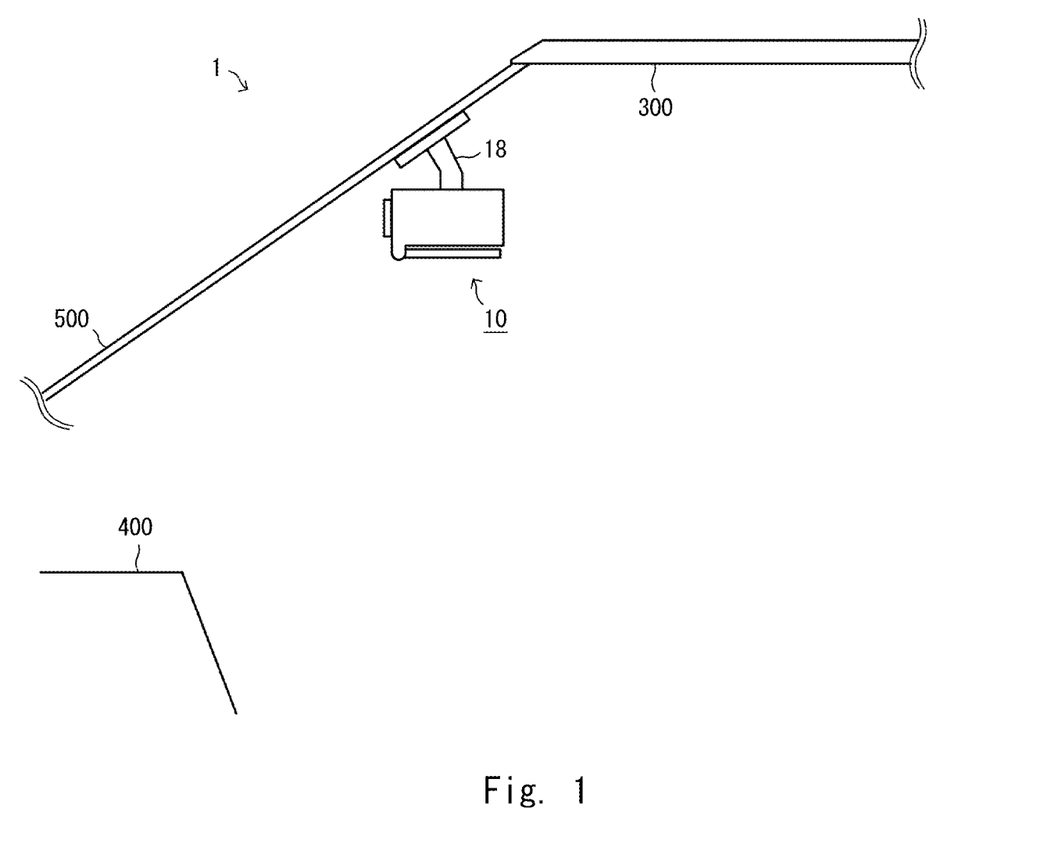
FIG. 1 is a view schematically showing an example of installing a recording apparatus for a vehicle in a vehicle according to the present invention.

FIG. 1 is a view schematically showing an example in which a recording apparatus for a vehicle 10 according to a first embodiment of the present invention is installed in a vehicle 1. A configuration of the vehicle 1 is simplified in FIG. 1. Only a ceiling part 300, a dashboard 400, and a windshield 500 are illustrated in FIG. 1. The recording apparatus for a vehicle 10 is installed on the inclined windshield 500 and inside a vehicle compartment, which is on the right side of the drawing. It is required in Japan that, when the recording apparatus for a vehicle 10, which is a drive recorder, is installed by attaching it at an upper part of the windshield 500, it should be installed at a position within a range of 20% of a length of the windshield 500 from an upper end of the windshield 500. The dashboard 400 is present below the windshield 500 and the recording apparatus for a vehicle 10.

In FIG. 1, the left direction of the drawing is the front of the vehicle 1 and is also a direction in which the recording apparatus for a vehicle 10 photographs a video image. The recording apparatus for a vehicle 10 records a video image outside the vehicle through the windshield 500.

Figure 2:
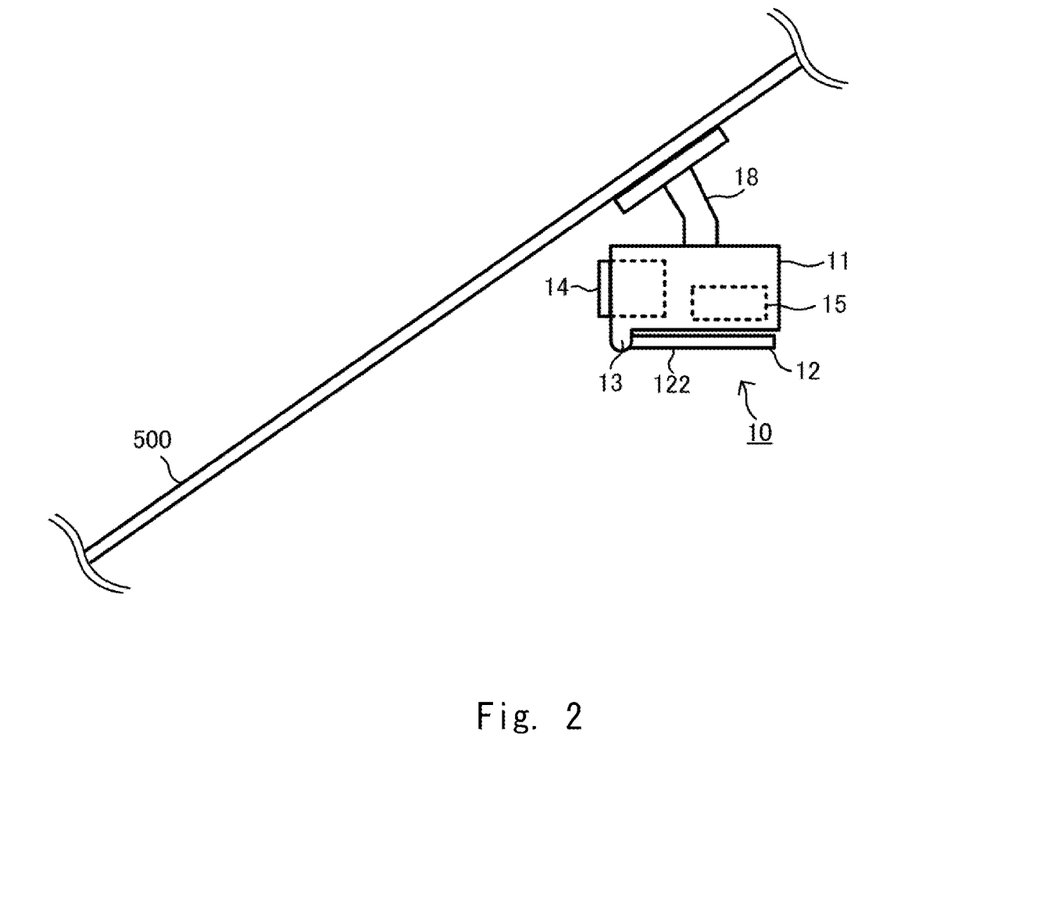
FIG. 2 is a view schematically showing an example of a state and a configuration of the recording apparatus for a vehicle according to a first embodiment of the present invention.

FIG. 2 is a view schematically showing an example of a state and a configuration of the recording apparatus for a vehicle 10 according to the first embodiment of the present invention. The recording apparatus for a vehicle 10 is mounted on the windshield 500 using a mounting part 18 in such a way that the photographing direction includes at least a horizontal plane. The mounting part 18 is mounted on the windshield 500 with, for example, a double-sided tape. The recording apparatus for a vehicle 10 includes at least a main body part 11, a display unit 12, a rotating part 13, a camera 14, and a control unit 15. The angle formed by the mounting part 18 and the main body part 11 may be adjustable.

The state in which the recording apparatus for a vehicle 10 shown in FIG. 2 is installed is a third arrangement according to the present invention. The third arrangement is a state in which the display unit 12 faces the main body part 11 with the rear surface 122 facing downward, which is a so-called stored state. The display unit 12 is rotatably mounted on the main body part 11 using the rotating part 13. The display unit 12 has a flat plate shape. One surface of the display unit 12 is a display surface 121 that displays various information items. The other surface of the display unit 12 is a rear surface 122 that does not display information. When the display unit 12 is in the third arrangement, the display surface 121 of the display unit 12 is protected, and the display unit 12 is compactly stored.

Figure 3:
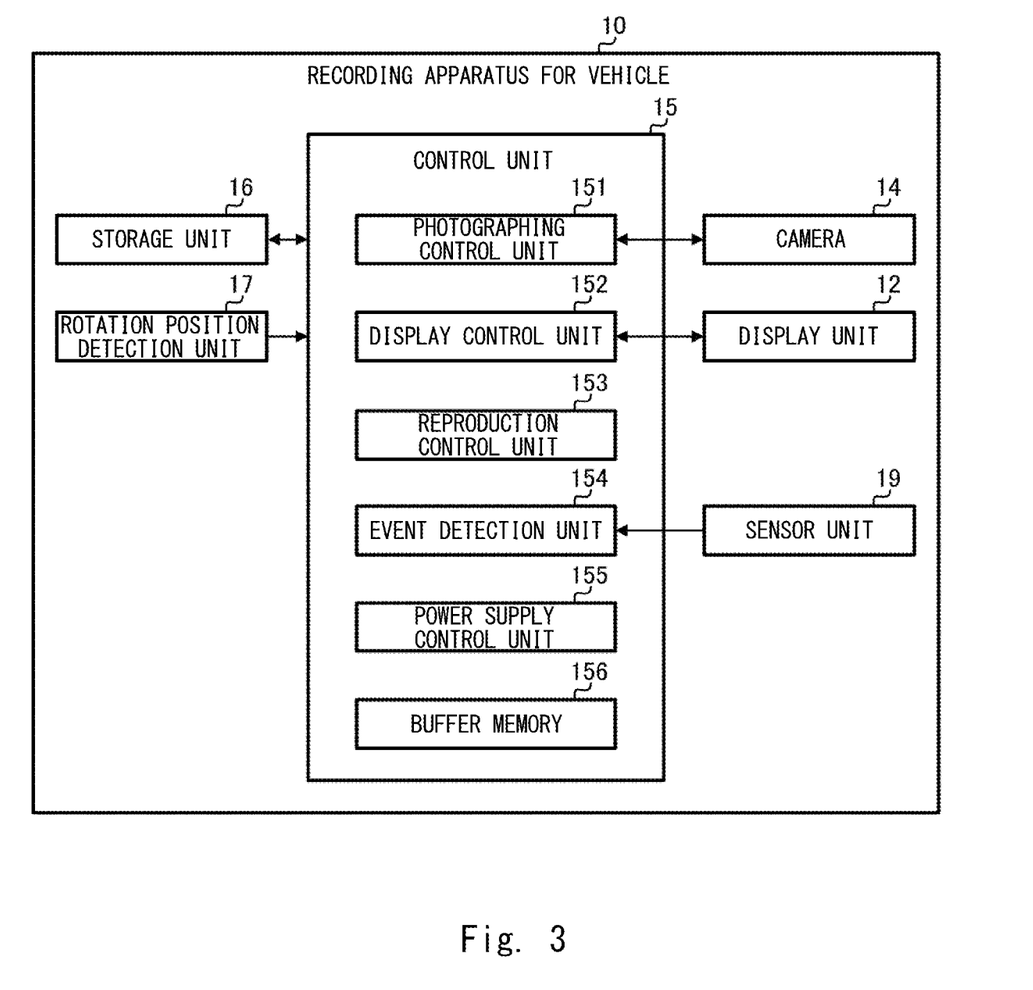
FIG. 3 is a block diagram showing a configuration of the recording apparatus for a vehicle according to the first embodiment of the present invention.

FIG. 3 is a block diagram showing a configuration of the recording apparatus for a vehicle 10 according to the first embodiment of the present invention. In addition to the display unit 12, the camera 14, and the control unit 15 shown in FIG. 2, the recording apparatus for a vehicle 10 further includes a storage unit 16, a rotation position detection unit 17, and a sensor unit 19.

The control unit 15 includes one or more CPUs (Central Processing Units), GPUs (Graphics Processing Units), a buffer memory 156, and the like that perform various types of data processing. The control unit 15 includes at least a photographing control unit 151, a display control unit 152, a reproduction control unit 153, an event detection unit 154, and a power supply control unit 155. These components are implemented as functions of the control unit 15.

The storage unit 16 is a recording element built in or removable from the recording apparatus for a vehicle 10.

The photographing control unit 151 controls an operation of the camera 14 and also controls a photographing operation that acquires video image data photographed by the camera 14 and records it in the storage unit 16 via the buffer memory 156. The reproduction control unit 153 controls a reproduction operation that reads and reproduces the video image data recorded in the storage unit 16. The display control unit 152 controls the display unit 12 to display the video image data when the reproduction control unit 153 reproduces a display regarding settings of the recording apparatus for a vehicle 10 and the video image data recorded in the storage unit 16 by the photographing control unit 151. The display control unit 152 also controls the display unit 12 to turn on or off its display.

The buffer memory 156 is an internal memory included in the control unit 15, and records the video image data, which has been acquired by the photographing control unit 151 for a predetermined time, while updating it.

The event detection unit 154 determines whether an event has occurred based on the information acquired from the sensor unit 19. When an event occurs, the event detection unit 154 performs processing to output information indicating that the event has occurred to the photographing control unit 151.

When the photographing control unit 151 has not acquired the information indicating that the event has been detected from the event detection unit 154, it records the video image data photographed by the camera 14 in the storage unit 16 in such a way that the video image data can be overwritten by the buffer memory 156. Such a photographing operation is referred to as a loop recording operation. When the photographing control unit 151 has acquired the information indicating that the event has been detected from the event detection unit 154, it controls the storage unit 16 to record the video image data from a predetermined time before the event detection until after a predetermined time in such a way that the video image data is prohibited from being overwritten by the buffer memory 156. Such a photographing operation is referred to as an event recording operation.

In the event recording operation, for example, the photographing control unit 151 controls the storage unit 16 to record the video image data, for example, from ten seconds before the event detection until an end of the event or the video image data, for example, from the event detection until ten seconds later in such a way that the video image data is prohibited from being overwritten by the buffer memory 156. In the loop recording operation, the photographing control unit 151 controls the storage unit 16 to record overwritable video image data in the storage unit 16. When the storage unit 16 reaches an upper limit of a storage capacity for overwritable video image data, the photographing control unit 151 controls the control unit 16 to record next overwritable video image data while deleting the recorded overwritable video image data.

The power supply control unit 155 controls the recording apparatus for a vehicle 10 to be powered on or off. The power-off includes a standby state.

The display unit 12 is, for example, a liquid crystal panel, an organic EL panel, or a screen of a projected image. The camera 14 is composed of, for example, a light receiving element for receiving visible light and converting it into electrical data and a lens. The sensor unit 19 is, for example, an acceleration sensor or a microphone mounted on the recording apparatus for a vehicle 10. The sensor unit 19 outputs detection results used for detecting an event such as acceleration information and sound volume information related to the vehicle 1 or the recording apparatus for a vehicle 10 to the event detection unit 154.

The event detection unit 154 acquires the detection results of the sensor unit 19 at all times at least during the period when the photographing control unit 151 records the video image data. When a condition is satisfied, for example, when the acceleration information acquired from the sensor unit 19 indicates an acceleration exceeding a predetermined threshold or the sound volume information indicates a sound volume exceeding a predetermined threshold, the event detection unit 154 determines that a event, such as a collision between the vehicle 1 and another object or a trouble involving a user of the vehicle 1, has occurred.

When the event detection unit 154 detects an occurrence of an event based on the acceleration information acquired from the sensor unit 19, it determines that an event has occurred if it detects the acceleration with magnitude exceeding the predetermined threshold and corresponding to magnitude of acceleration upon a collision between the vehicle and another object. The event detection unit 154 may determine that an event has occurred based on a transition of the acceleration with magnitude exceeding the predetermined threshold and corresponding to magnitude of acceleration upon a collision between the vehicle and another object. When the event detection unit 154 detects an occurrence of an event based on the sound volume acquired from the sensor unit 19, it determines that an event has occurred if it detects a sound with a volume exceeding the predetermined threshold and corresponding a collision sound, a scream or the like.

The rotation position detection unit 17 is provided in the rotating part 13, and detects a rotation position of the display unit 12 with respect to the main body part 11. The rotation position detection unit 17 detects the rotation position of the display unit 12, for example, by a change in a position of electrical contact or a change in an electric resistance value caused by the rotation of the rotating part 13. The rotation position detection unit 17 may be capable of continuously detecting the rotation position of the display unit 12 with respect to the main body part 11 or intermittently detecting only the necessary rotation position.

Figure 4:
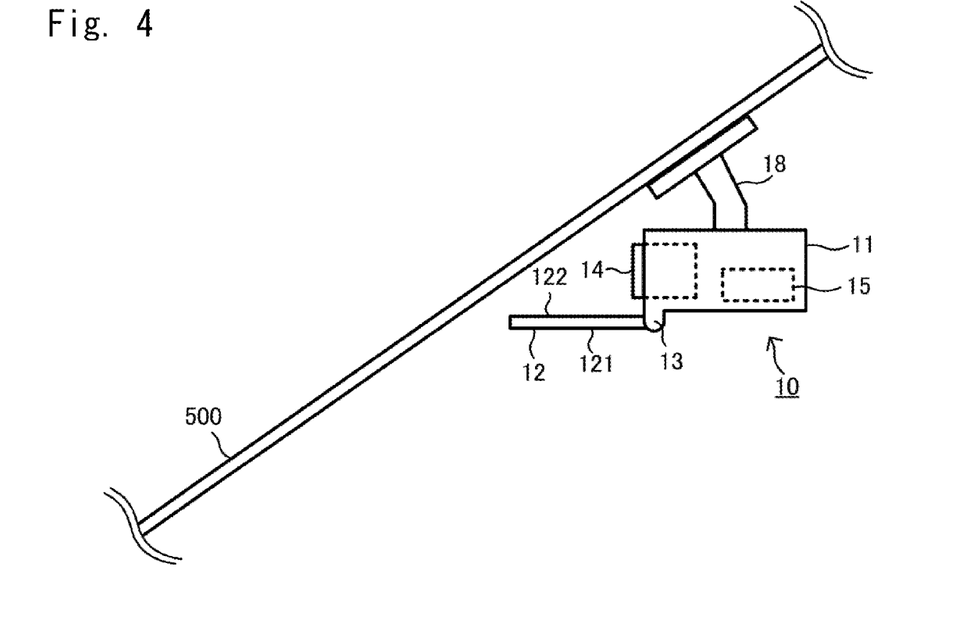
FIG. 4 is a view schematically showing an example of a state of the recording apparatus for a vehicle according to the first embodiment of the present invention.

FIG. 4 is a view schematically showing an example of a state of the recording apparatus for a vehicle 10 according to the first embodiment of the present invention. A difference between FIG. 4 and FIG. 2 is that in FIG. 4, the display unit 12 is in a first arrangement, in which the display surface 121 faces downward.

As shown in FIG. 4, when the display unit 12 is in the first arrangement, it is possible to effectively prevent the dashboard 400 and surrounding objects from being reflected on the inclined windshield 500 and caught by the camera 14.

In the example of FIG. 4, while the display unit 12 is in the first arrangement, the display unit 12 is in the state where the display surface 121 faces downward, and the display unit 12 is held horizontally or nearly horizontally. In the case of the first arrangement shown in FIG. 4, reflected glare may occur when external light entering from the outside of the vehicle through the windshield 500 is reflected on the rear surface 122 of the display unit 12.

In order to avoid this, the rear surface 122 of the display unit 12 is preferably a light absorption surface. For example, the rear surface 122 of the display unit 12 may be painted with matte black, may be uneven, or may include a light absorbing member attached thereto.

Figure 5:
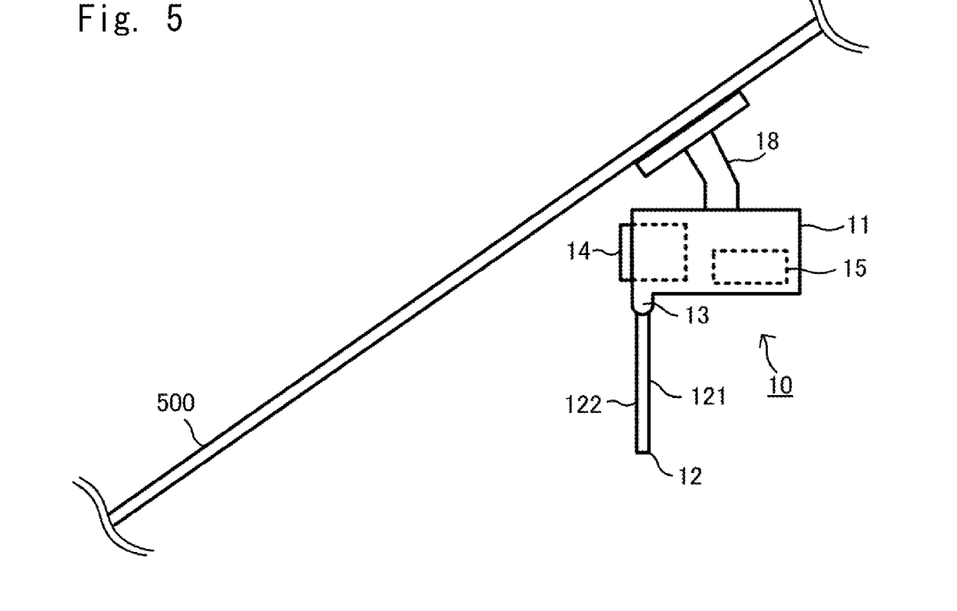
FIG. 5 is a view schematically showing an example of a state of the recording apparatus for a vehicle according to the first embodiment of the present invention.

FIG. 5 is a view schematically showing an example of a state of the recording apparatus for a vehicle 10 according to the first embodiment of the invention. A difference between FIG. 5 and FIGS. 2 and 4 is that in FIG. 5, the display unit 12 is in the second arrangement, in which the display unit 12 is held vertically or nearly vertically. For example, in the second arrangement, the display unit 12 may be at an angle that allows the user, who is the driver of the vehicle 1, to properly view the information displayed on the display surface 121 of the display unit 12.

As shown in FIG. 5, when the display unit 12 is in the second arrangement, the display surface 121 faces the user, and thus it becomes easy for the user to check the information displayed on the display surface 121 of the display unit 12.

Next, processing when the arrangement of the display unit 12 changes from the first arrangement to the third arrangement will be described with reference to FIG. 6.

First, the power supply control unit 155 turns on the power so that the recording apparatus for a vehicle 10 can be operated based on a certain power-on trigger (Step S11). The power-on trigger is activated, for example, when power is supplied to the recording apparatus for a vehicle 10, which is caused by a start of the operation of the vehicle 1, on which the recording apparatus for a vehicle 10 is mounted.

When the operation of the recording apparatus for a vehicle 10 becomes possible, the photographing control unit 151 starts to control the photographing operation (Step S12). This is because when the recording apparatus for a vehicle 10 is a drive recorder, it is necessary to start the photographing operation at the start of the operation of the vehicle 1, even if there is no operation by the user or the like. The photographing operation started in Step S12 is so-called loop recording in which the video image data can be overwritten. While the recording apparatus for a vehicle 10 is performing the photographing operation, an operation for detecting an event is performed at all times, which is not shown in FIG. 6. When an event is detected, the video image data is recorded in such a way that it is prohibited from being overwritten, which is referred to as event recording.

After the processing of Step S12 or simultaneously with the processing of Step S12, the control unit 15 determines whether the position of the display unit 12 is in the third arrangement based on the detection result of the rotation position detection unit 17 (Step S13). In Step S13, when the control unit 15 determines that the display unit 12 is in the third arrangement (Step S13: Yes), i.e., when the recording apparatus for a vehicle 10 has started to operate with the third arrangement, the control unit 15 determines whether a certain power-off trigger has occurred (Step S14). The power-off trigger refers to, for example, an end of the operation of the vehicle 1 on which the recording apparatus for a vehicle 10 is mounted. Specifically, the power-off trigger is based on a turning-off of the engine.

In Step S14, when the control unit 15 determines that the engine is not turned off (Step S14: No), the determination of S13 is continued. Whereas when the control unit 15 determines that the engine is turned off in Step S14 (Step S14: Yes), the power supply control unit 155 turns off the power supply of the recording apparatus for a vehicle 10 (Step S15), and ends this processing. If the photographing operation, the reproduction operation, a display operation or the like is performed when the control unit 15 determines that the engine is turned off in Step S14, the power supply control unit 155 ends those operations and turns off the power.

In Step S13, when the control unit 15 determines that the display unit 12 is not in the third arrangement (Step S13: No), namely, when the display unit 12 is in the first or second arrangement, the display control unit 152 starts displaying the video image from the camera 14, which has been acquired by the photographing control unit 151 (Step S16). The processing of Step S16 is a so-called live view display or a through image display, in which the photographed video image that is being recorded is displayed.

In Step S13, when the control unit 15 determines that the display unit 12 is in the second arrangement, not the third arrangement, it starts the live view display, because the display unit 12 in the second arrangement allows the user to easily check the contents of the display. In Step S13, when the control unit 15 determines that the display unit 12 is in the first arrangement, not the third arrangement, it may not perform the live view display, because the display unit 12 in the first arrangement is disposed at a position from which it is not easy for the user to check the contents of the display.

After the live view display is started as the processing of Step S16, the control unit 15 determines whether the arrangement of the display unit 12 has changed based on the detection result of the rotation position detection unit 17 (Step S17). In Step S17, when the control unit 15 determines that the arrangement of the display unit 12 has changed (Step S17: Yes), it determines whether the arrangement of the display unit 12 has changed to the third arrangement based on the detection result by the rotation position detection unit 17 (Step S18). While the determination in Step S17 is being made, the arrangement of the display unit 12 is either the first arrangement or the second arrangement. Therefore, the condition for Step S18 to become Yes is when the arrangement of the display unit 12 has changed from the first arrangement to the third arrangement, or when the arrangement of the display unit 12 has changed from the second arrangement to the third arrangement.

In Step S18, when the control unit 15 determines that the arrangement has not changed to the third arrangement (Step S18: No), it continues the processing of Step S17. When the control unit 15 determines that the arrangement has changed to the third arrangement in Step S18 (Step S18: Yes), it ends the live view display (Step S19). The processing of Step S19 may be that the live view display is ended when the determination of Step S18 is Yes and the live view display is shown. In Step S19, after the live view display is ended, the processing proceeds to Step S14.

In Step S17, when the control unit 15 determines that the arrangement of the display unit 12 has not changed (Step S17: No), it determines whether the reproduction has started (Step S20). The determination of whether the reproduction has started is, for example, a determination as to whether a reproduction start trigger, such as reception of an operation of the user for reproducing the video image data, has occurred.

In Step S20, when the control unit 15 determines that the reproduction has not started (Step S20: No), the processing of Step S17 is continued. In Step S20, when the control unit 15 determines that the reproduction has started (Step S20: Yes), the photographing/recording processing started in Step S12 is stopped, the live view display is stopped if the live view display is started in Step S16, and reproduction of the video image data recorded in the storage unit 16 starts (Step S21). The video image data reproduced in the processing of Step S21 is specified video image data selected in a selection operation by the user. However, this video image data may be, for example, previous event recording data or video image data that is loop-recorded from a previous predetermined time.

After the reproduction of the video image data is started in Step S21, like in Step S14, the control unit 15 determines whether the certain power-off trigger, such as an engine-off, has occurred (Step S22). In Step S22, when the control unit 15 determines that the certain power-off trigger, such as an engine-off, has occurred (Step S22: Yes), the processing transitions to Step S15. In Step S22, when the control unit 15 determines that the certain power-off trigger, such as an engine-off, has not occurred, (Step S22: No), the control unit 15 determines whether the reproduction has ended (Step S23). The determination of whether the reproduction has ended is a determination of whether a reproduction end trigger, such as reception of an operation of the user for stopping the reproduction or completion of the reproduction of the video image data to be reproduced until the end, has occurred.

In Step S23, when the control unit 15 determines that the reproduction has not ended (Step S23: No), the processing of Step S22 is continued. In Step S23, when the control unit 15 determines that the reproduction has ended (Step 23: Yes), the reproduction control unit 153 stops the reproduction operation of the video image data and controls the photographing control unit 151 to start the photographing operation (Step S24). After the processing of Step S24, the processing of Step S16 is performed. That is, the reproduction operation is ended, the photographing operation stopped in Step S21 is started, and the live view display of the video image being photographed is started.

By enabling the above-described processing with the arrangements of the display unit 12 of the recording apparatus for a vehicle 10, the display unit 12 can be disposed in the first arrangement while the video image data is being photographed and recorded during the operation of the recording apparatus for a vehicle 10. This achieves recording of high-quality video image data with reduced reflected glare.

Figure 6:
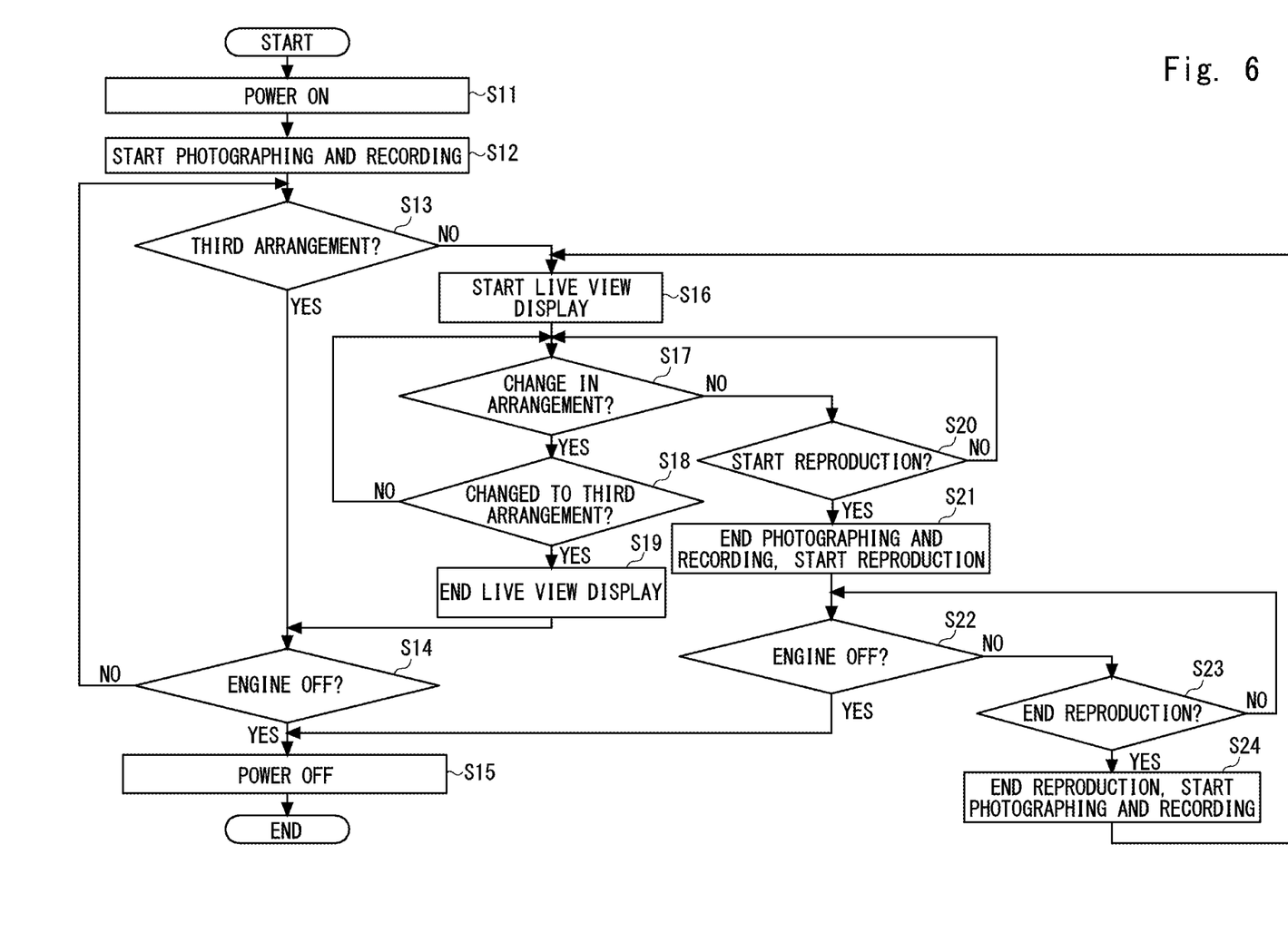
FIG. 6 is a flowchart showing processing of the recording apparatus for a vehicle according to the first embodiment of the present invention.

FIG. 6 is a flowchart showing processing when the photographing operation is performed even with the third arrangement, because the processing is for the case when the recording apparatus for a vehicle 10 is a drive recorder. In addition to the processing shown in FIG. 6, various types of processing may be executed by associating the arrangements with processing, and changing the arrangements of the display unit 12.

For example, when the display unit 12 is in the third arrangement, the photographing operation is not performed, and the state of the recording apparatus for a vehicle 10 becomes the standby mode or the recording apparatus for a vehicle 10 is powered off. Further, when the display unit 12 is in the second arrangement, the reproduction operation for reproducing the video image data recorded in the storage unit 16 can be executed. When the display unit 12 is in the first arrangement, the photographing operation is executed.

Moreover, as the condition for the first arrangement of the display unit 12, when the second arrangement is maintained for a predetermined time or longer, for example two seconds or longer, and then the display unit 12 changes to the first arrangement, a recording operation is performed, in which the loop recording is started and the event recording is performed upon an event detection. When the arrangement has changed to the first arrangement within a predetermined time from the third arrangement after being in the second arrangement, the processing that is executed when the display unit 12 changes to the second arrangement may be skipped, and the recording operation as the event recording may be started.

In addition, as the condition for the second arrangement of the display unit 12, when the display unit 12 changes from the third arrangement to the second embodiment, specified video image data recorded in the storage unit 16 may become reproducible. When the display unit 12 changes from the first arrangement to the second arrangement, the reproduction operation for reproducing the previous video image data recorded in the storage unit 16 may be performed. When the display unit 12 changes from the first arrangement to the second arrangement, the video image data recorded in the latest event recording may be reproduced.

By the above-described processing, it is possible to easily and quickly control the operation of the recording apparatus for a vehicle 10 by rotating the display unit 12. Additionally, by performing recording at least while the display unit 12 is in the first arrangement, reflected glare due to the incidence of external light can be reduced.

Figure 7:
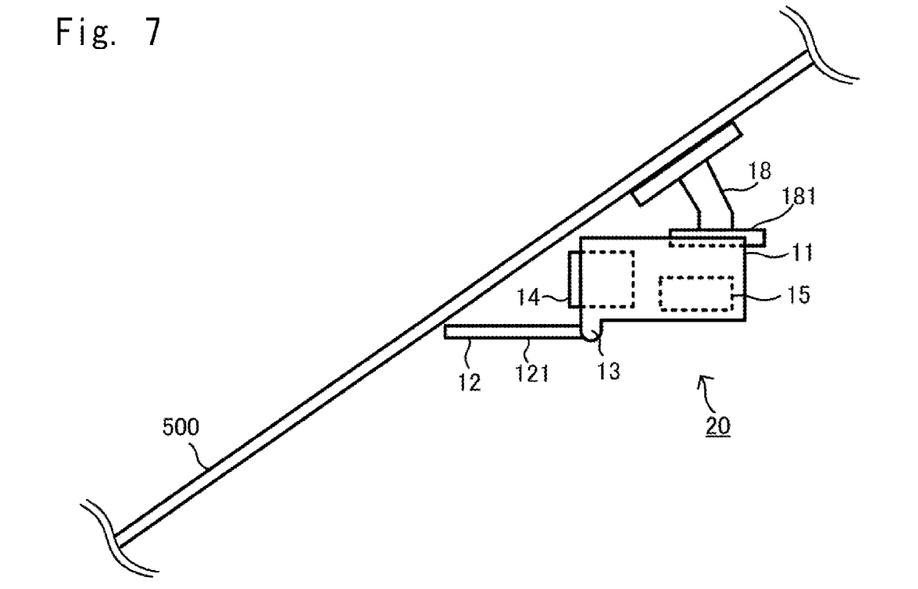
FIG. 7 is a view schematically showing an example of a state of a recording apparatus for a vehicle according to a second embodiment of the present invention.

FIG. 7 is a view schematically showing an example of a state and a configuration of a recording apparatus for a vehicle 20 according to the second embodiment of the present invention. A difference between the recording apparatus for a vehicle 20 according to the second embodiment and the recording apparatus for a vehicle 10 according to the first embodiment is that, in the recording apparatus for a vehicle 20 according to the second embodiment, a slide part 181 is included in the mounting part 18. The slide part 181 is a member that can slide the main body part 11 in a back and forth direction, which is a left and right direction of the drawing, while maintaining the photographing orientation of the main body part 11.

As shown in FIG. 7, when the display unit 12 is slid along the slide part 181 while the display unit 12 is in the first arrangement, a front end part of the display unit 12 (an end of the left side of the drawing) can be brought closer to the windshield 500. By bringing the front end part of the display unit 12 close to the windshield 500, it is possible to reduce the gap between the display unit 12 and the windshield 500, further blocking reflected light from the dashboard 400 and the like. Therefore, when recording is performed in a state in which the display unit 12 is brought close to the windshield 500 while the display unit 12 is in the first arrangement, reflected glare due to the incidence of external light can be further reduced.

Figure 8:
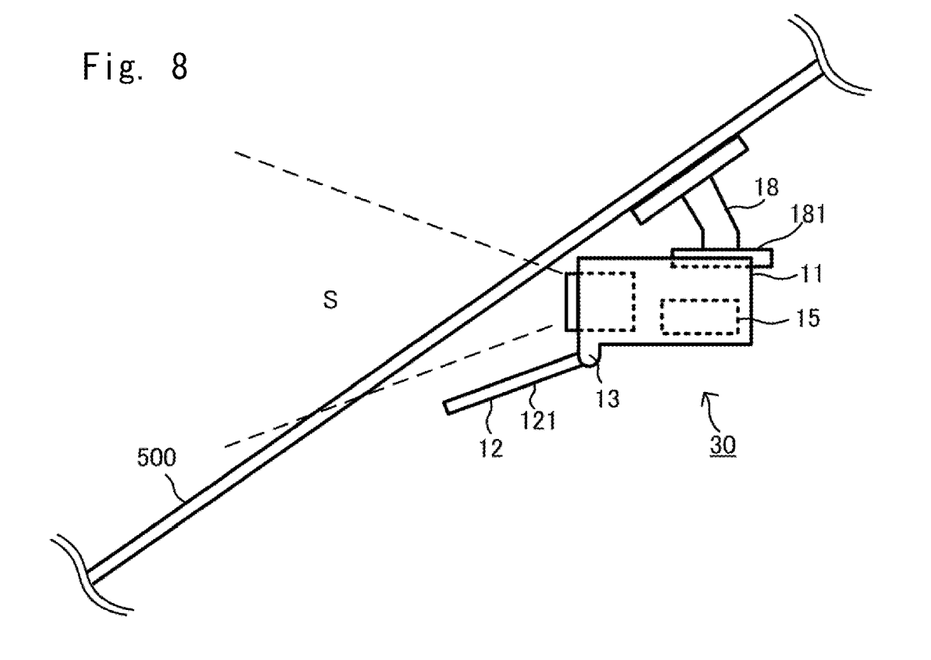
FIG. 8 is a view schematically showing an example of a state of the recording apparatus for a vehicle according to a third embodiment of the present invention.

FIG. 8 is a view schematically showing an example of a state and a configuration of a recording apparatus for a vehicle 30 according to a third embodiment of the present invention. In the third embodiment, the presence or absence of the slide part 181 is irrelevant. A difference between the recording apparatus for a vehicle 30 according to the third embodiment and the recording apparatus for a vehicle 10 according to the first embodiment is that an angle of the display unit 12 in the first arrangement is set in such a way that the display unit 12 does not enter the photographing range of the camera 14 according to an angle of view of the camera 14.

As shown in FIG. 8, when the angle of view of the camera 14 in the vertical direction is referred to as an angle of view S, the position of the display unit 12 at which the display unit 12 does not enter the angle of view S is defined as the first arrangement. In this case, the rotating part 13 may be restricted to rotate so that the display unit 12 does not enter the angle of view S of the camera 14. Therefore, when the recording is performed while the display unit 12 is in the first arrangement, it is possible to reduce the reflected glare due to the incidence of external light and to effectively prevent the display unit 12 from entering the photographing range of the camera 14. Like in the second embodiment, the slide part 181 is provided in the mounting part 18 in the third embodiment, and the display unit 12 is brought close to the windshield 500 while the display unit 12 is in the first arrangement. This more effectively prevents the reflected glare due to the incidence of external light.

Figure 9:
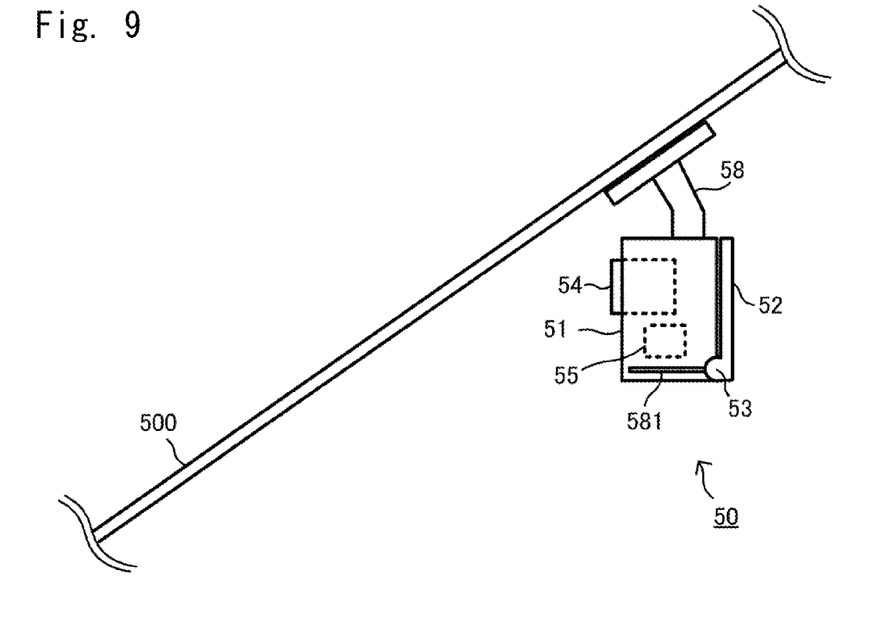
FIG. 9 is a view schematically showing an example of a state of the recording apparatus for a vehicle according to a fourth embodiment of the present invention.
Figure 10:
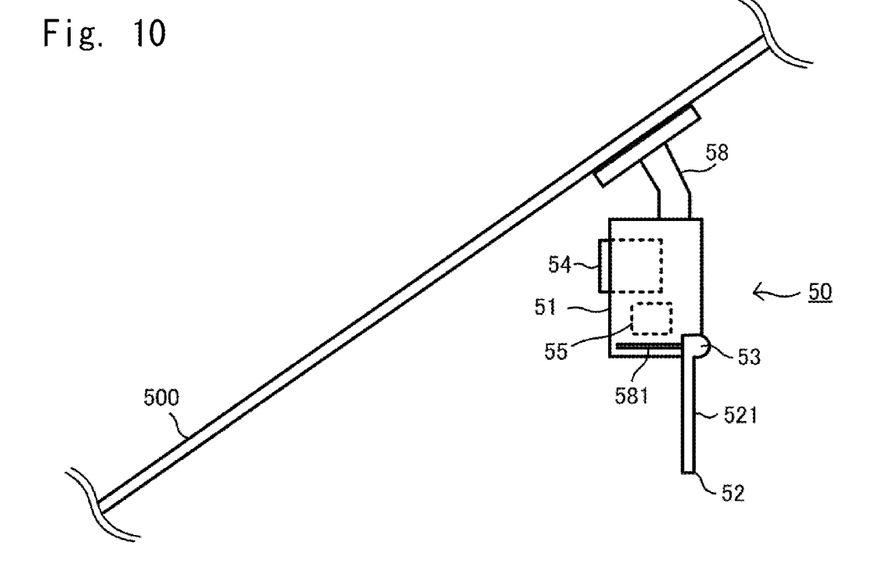
FIG. 10 is a view schematically showing an example of a state of the recording apparatus for a vehicle according to the fourth embodiment of the present invention.
Figure 11:
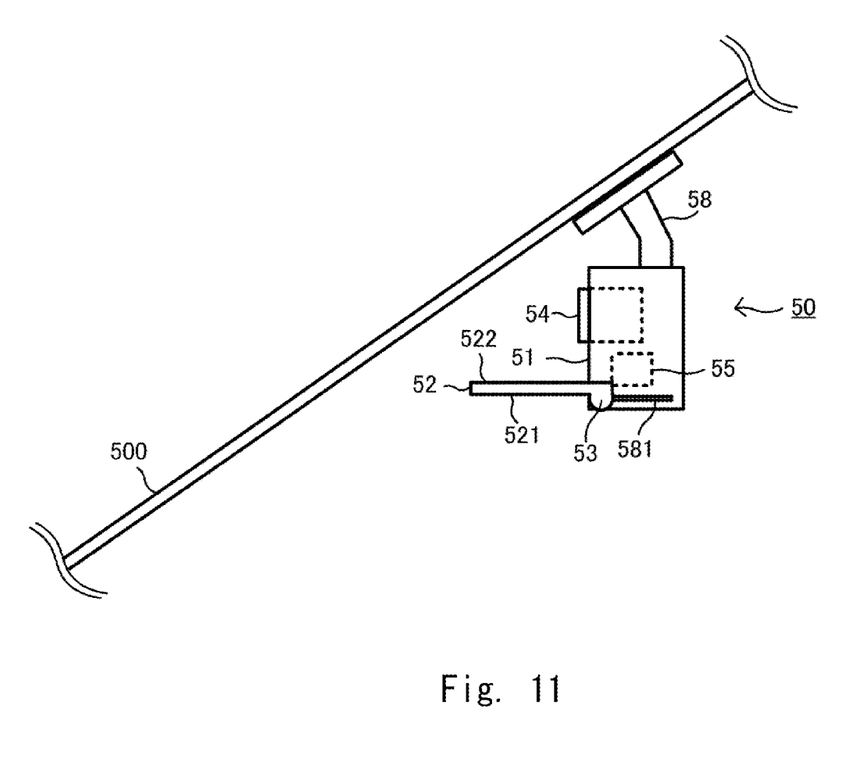
FIG. 11 is a view schematically showing an example of a state of the recording apparatus for a vehicle according to the fourth embodiment of the present invention.

FIGS. 9 to 11 are views schematically showing examples in which a recording apparatus for a vehicle 50 according to a fourth embodiment of the present invention is installed in the vehicle 1. FIG. 9 shows a state in which the recording apparatus for a vehicle 50 is in the third arrangement. FIG. 10 shows a state in which the recording apparatus for a vehicle 50 is in the second arrangement. FIG. 11 shows a state in which the recording apparatus for a vehicle 50 is in the first arrangement. The recording apparatus for a vehicle 50 according to the fourth embodiment of the present invention differs from the recording apparatuses for a vehicle according to the other embodiments in its structure, but the recording apparatus for a vehicle 50 according to the fourth embodiment of the present invention has the same configuration as the configuration shown in FIG. 3 and performs the same processing as the processing shown in FIG. 6.

The configuration of the recording apparatus for a vehicle 50 according to the fourth embodiment is substantially the same as the configurations of the recording apparatuses for a vehicle according to other embodiments. A main body part 51 of the recording apparatus for a vehicle 50 according to the fourth embodiment corresponds to the main body part 11 of the recording apparatuses for a vehicle according to other embodiments, except that the shape of the main body part 51 viewed from the side is a vertically elongated shape. A display unit 52, a display surface 521, and a rear surface 522 correspond to the display unit 12, the display surface 121, and the rear surface 122, respectively. A camera 54, a control unit 55, and a mounting part 58 correspond to the camera 14, the control unit 15, and the mounting part 18, respectively. A rotating part 53 corresponds to the rotating part 13. The rotating part 53 can slide the display unit 52 along a slide part 581.

The display unit 52 is rotated by the rotating part 53 for a transition between the third arrangement and the second arrangement. The display unit 52 is rotated by the rotating part 53 and the display unit 52 is slid along the slide part 581 for a transition between the second arrangement and the first arrangement. Like in the recording apparatus for a vehicle 20 according to the second embodiment, which is not shown in the drawings, a slide part may be provided in the mounting part 58. In addition, like the recording apparatus for a vehicle 30 according to the third embodiment, the first arrangement may be set at an angle so that the display unit 52 does not enter the angle of view of the camera 54.

With such a configuration, the recording apparatus for a vehicle 50 configured to be thin in the back and forth direction can achieve the same effects as those of the other embodiments.

Note that the present invention is not limited to the above-described embodiments, and modifications can be made without departing from the spirit of the invention.

For example, in the second embodiment, the slide part 181 is provided to enable the display unit 12 to slide the main body part 11 back and forth to be brought close to the windshield 500. However, the same effect as the above effect achieved by the second embodiment can be achieved by providing a configuration for bringing the display unit 12 close to the windshield 500 between the main body part 11 and the rotating part 13.

Further, when the display unit 12 is in the second arrangement, detection of a touch on the entire or substantially the entire surface of a touch detection surface of the display unit 12, which is functioning as a touch panel, may be an instruction to start photographing a video image and start recording video image data. In this case, when the second arrangement changes to the first arrangement while the user is pressing the display surface 121, which is functioning as a touch panel, a touch on the touch panel is detected. In the state of the first arrangement, in which the photographing control unit 151 starts the recording, the detection on the touch panel may be continued regardless of whether the information is displayed on the display unit 12. In such processing, since the recording is also started by the operation of rotating the display unit 12 so that it will be in the first arrangement, the recording operation according to the user's determination can be more appropriately performed.

A protective member may be provided at the end of the display unit 12, which is brought close to the windshield 500 in the first arrangement. The protective member is preferably an elastic member that can stop or effectively prevent the display unit 12 and the recording apparatus for a vehicle 10 from being damaged even when the end of the display unit 12 hits the windshield 500 due to vibration generated, for example, while the vehicle 1 is travelling. Furthermore, a shielding member for preventing or reducing transmission of light from the gap between an end surface of the display unit 12 and the windshield 500 in the first arrangement may be provided at the end of the display unit 12. It is preferable that the shielding member be, for example, a flexible black material or one that transmits little light.

According to the embodiments, it is possible to provide a recording apparatus for a vehicle capable of recording a video image with reduced reflected glare.

The exemplary embodiments can be applied to a recording apparatus that is mounted on, for example, a vehicle and that records photographing data and is susceptible of industrial application.

What is claimed is:

1. A recording apparatus for a vehicle comprising:
    a main body part comprising at least a camera;
    a mounting part configured to mount the main body part so that the camera is oriented to photograph outside of a vehicle through a windshield included in the vehicle; and
    a display unit configured to display information, wherein the display unit is rotatably mounted at a lower part of the main body part and is positioned to block light from below the camera when the display unit rotates in a direction in which the camera photographs a video image and a display surface of the display unit faces downward, which is referred to as a first arrangement; and
    a photographing control unit configured to control a photographing operation for controlling a storage unit to record video image data photographed by the camera, wherein the photographing control unit controls the photographing operation to be started when the display unit is disposed in the first arrangement.

2. The recording apparatus for a vehicle according to claim 1, wherein, when a second arrangement, in which the display unit is oriented to allow a user to visually confirm the display surface, is maintained for a predetermined time and then changed to the first arrangement, the photographing control unit records the video image data photographed by the camera in the storage unit in a overwritable manner, while when the display unit changes to the first arrangement within a predetermined time from the third arrangement, which is a stored state, after being in the second arrangement, the photographing control unit records the video image data photographed by the camera in such a way that the video image data is prohibited from being overwritten.

3. The recording apparatus for a vehicle according to claim 1, further comprising a reproduction control unit configured to control a reproduction operation of the video image data recorded in the storage unit, wherein the reproduction control unit activates the reproduction operation when the display unit is in the second arrangement, in which the display unit is oriented to allow the user to visually confirm the display surface.

4. The recording apparatus for a vehicle according to claim 3, wherein, when the display unit changes from the third arrangement, in which the display unit is in the stored state, to the second arrangement, the reproduction control unit activates the reproduction operation for reproducing specified video image data recorded in the storage unit, while when the display unit changes from the first arrangement to the second arrangement, the reproduction control unit performs the reproduction operation for reproducing previous video image data stored in the storage unit.

5. The recording apparatus for a vehicle according to claim 4, wherein, when the display unit changes from the first arrangement to the second arrangement, the reproduction control unit performs the reproduction operation for reproducing the previous video image data recorded in the storage unit in such a manner that the video image data is prohibited from being overwritten.

6. The recording apparatus for a vehicle according to claim 1, further comprising a slide part configured to bring the display unit close to the windshield.

7. The recording apparatus for a vehicle according to claim 1, wherein a rear surface of the display unit is a light absorption surface.

8. The recording apparatus for a vehicle according to claim 1, wherein the first arrangement is defined as a position of the display unit where the display unit rotates in the direction in which the camera photographs the video image, the display surface of the display unit faces downward, and the display unit does not enter a photographing range of the camera.

* * * * *